(12) United States Patent
Nagamine et al.

(10) Patent No.: US 6,597,403 B1
(45) Date of Patent: Jul. 22, 2003

(54) SYSTEM FOR GENERATING HORIZONTAL SYNCHRONIZING SIGNAL COMPATIBLE WITH MULTI-SCAN

(75) Inventors: Takatomo Nagamine, Chiba (JP); Satoshi Miura, Kanagawa (JP); Shinji Takahashi, Kanagawa (JP)

(73) Assignee: Sony Corporation, Tokyo (JP)

( * ) Notice: Subject to any disclaimer, the term of this patent is extended or adjusted under 35 U.S.C. 154(b) by 406 days.

(21) Appl. No.: 09/666,781

(22) Filed: Sep. 21, 2000

(30) Foreign Application Priority Data

Sep. 22, 1999 (JP) ............................................. 11-268434

(51) Int. Cl.[7] .......................... H04N 5/06; H04N 9/45; H04N 9/455
(52) U.S. Cl. ...................... 348/521; 348/524; 348/531; 348/540
(58) Field of Search ................................. 348/521, 524, 348/530, 531, 540, 546; 345/132, 213; H04N 5/06, 9/45, 9/455, 5/05, 5/45

(56) References Cited

U.S. PATENT DOCUMENTS

| | | | | |
|---|---|---|---|---|
| 5,021,719 A | * | 6/1991 | Arai et al. | .................. 315/364 |
| 5,487,097 A | * | 1/1996 | Hatakenaka et al. | .......... 377/20 |
| 5,777,520 A | * | 7/1998 | Kawakami | ................... 348/540 |
| 5,786,867 A | * | 7/1998 | Suh | ............................. 348/521 |
| 6,008,791 A | * | 12/1999 | Arai et al. | .................... 345/132 |
| 6,172,711 B1 | * | 1/2001 | Masumoto et al. | ......... 348/524 |
| 6,515,708 B1 | * | 2/2003 | Kato | ........................... 348/524 |

* cited by examiner

Primary Examiner—John Miller
Assistant Examiner—Trang U. Tran
(74) Attorney, Agent, or Firm—Frommer Lawrence & Haug LLP; William S. Frommer

(57) ABSTRACT

There can be solved a problem in which a lock range is narrowed by using an oscillator such as a ceramic having a high Q and a horizontal deflection frequency generating system compatible with all horizontal deflection frequencies of a variety of television systems cannot be formed without difficulty. This system includes a frequency-fixed oscillator oscillating at a frequency $f_0$ sufficiently higher than a deflection frequency fh in a multi-scan display, a first counter for counting a clock outputted from said oscillator in a descending order, a duration in which an integer n which results from rounding a decimal point of a value obtained by a division of $f_0$ fh is divided by an integer m smaller than n and said first counter counts a value k thus obtained k times is set to one cycle and a duration in which a second counter for counting a value m times repeats the counting m cycles is set to one period and thereby generating a deflection frequency fh.

5 Claims, 10 Drawing Sheets

FIG. 10

| Counter 1 | | Counter 2 | | Counter 3 (Initial Value 0) | | | |
|---|---|---|---|---|---|---|---|
| Output C01 | Solid Circle Shows Switch SW Having Delay | m×fh Clock | Output C02 | Addition of Low-Order 5 Bits "10110" (1/2+1/8+1/16) | Value of Low Fifth Digit | Number of Carry | Carry Output C03 |
| 2/1/0 | | 0 | | 0.6875 | 0.6875 | 0 | 0 |
| 2/1/0 | • | 1 | | 1.3750 | 0.3750 | 1 | 1 |
| 2/1/0 | • | 2 | | 2.0625 | 0.0625 | 2 | 1 |
| 2/1/0 | | 3 | | 2.7500 | 0.7500 | 2 | 0 |
| 2/1/0 | • | 4 | | 3.4375 | 0.4375 | 3 | 1 |
| 2/1/0 | • | 5 | | 4.1250 | 0.1250 | 4 | 1 |
| 2/1/0 | | 6 | | 4.8125 | 0.8125 | 4 | 0 |
| 2/1/0 | • | 7 | | 5.5000 | 0.5000 | 5 | 1 |
| 2/1/0 | • | 8 | | 6.1875 | 0.1875 | 6 | 1 |
| 2/1/0 | | 9 | | 6.8750 | 0.8750 | 6 | 0 |
| 2/1/0 | • | 10 | | 7.5625 | 0.5625 | 7 | 1 |
| 2/1/0 | • | 11 | | 8.2500 | 0.2500 | 8 | 1 |
| 2/1/0 | | 12 | | 8.9375 | 0.9375 | 8 | 0 |
| 2/1/0 | • | 13 | | 9.6250 | 0.6250 | 9 | 1 |
| 2/1/0 | • | 14 | | 10.3125 | 0.3125 | 10 | 1 |
| 2/1/0 | • | 15 | | 11.0000 | 0.0000 | 11 | 1 |
| 2/1/0 | | 16 | | 11.6875 | 0.6875 | 11 | 0 |
| 2/1/0 | • | 17 | | 12.3750 | 0.3750 | 12 | 1 |
| 2/1/0 | • | 18 | | 13.0625 | 0.0625 | 13 | 1 |
| 2/1/0 | | 19 | | 13.7500 | 0.7500 | 13 | 0 |
| 2/1/0 | • | 20 | | 14.4375 | 0.4375 | 14 | 1 |
| 2/1/0 | • | 21 | | 15.1250 | 0.1250 | 15 | 1 |
| 2/1/0 | | 22 | | 15.8125 | 0.8125 | 15 | 0 |
| 2/1/0 | • | 23 | | 16.5000 | 0.5000 | 16 | 1 |
| 2/1/0 | • | 24 | | 17.1875 | 0.1875 | 17 | 1 |
| 2/1/0 | | 25 | | 17.8750 | 0.8750 | 17 | 0 |
| 2/1/0 | • | 26 | | 18.5625 | 0.5625 | 18 | 1 |
| 2/1/0 | • | 27 | | 19.2500 | 0.2500 | 19 | 1 |
| 2/1/0 | | 28 | | 19.9375 | 0.9375 | 19 | 0 |
| 2/1/0 | • | 29 | | 20.6250 | 0.6250 | 20 | 1 |
| 2/1/0 | • | 30 | | 21.3125 | 0.3125 | 21 | 1 |
| 2/1/0 | • | 31 | C02 Clear Signal Output | 22.0000 | 0.0000 | 22 | 1 |

FIG. 11

| Counter 1 | | Counter 2 | | Counter 3 (Initial Value 0.5) | | | |
|---|---|---|---|---|---|---|---|
| Output C01 | Solid Circle Shows Switch SW Having Delay | m×fh Clock | Output C02 | Addition of Low-Order 5 Bits "10110" (1/2+1/8+1/16) | Value of Low Fifth Digit | Number of Carry | Carry Output C03 |
| 2/1/0 | • | 0 | | 1.1875 | 0.1875 | 1 | 1 |
| 2/1/0 | | 1 | | 1.8750 | 0.8750 | 1 | 0 |
| 2/1/0 | • | 2 | | 2.5625 | 0.5625 | 2 | 1 |
| 2/1/0 | • | 3 | | 3.2500 | 0.2500 | 3 | 1 |
| 2/1/0 | | 4 | | 3.9375 | 0.9375 | 3 | 0 |
| 2/1/0 | • | 5 | | 4.6250 | 0.6250 | 4 | 1 |
| 2/1/0 | • | 6 | | 5.3125 | 0.3125 | 5 | 1 |
| 2/1/0 | • | 7 | | 6.0000 | 0.0000 | 6 | 1 |
| 2/1/0 | | 8 | | 6.6875 | 0.6875 | 6 | 0 |
| 2/1/0 | • | 9 | | 7.3750 | 0.3750 | 7 | 1 |
| 2/1/0 | • | 10 | | 8.0625 | 0.0625 | 8 | 1 |
| 2/1/0 | | 11 | | 8.7500 | 0.7500 | 8 | 0 |
| 2/1/0 | • | 12 | | 9.4375 | 0.4375 | 9 | 1 |
| 2/1/0 | • | 13 | | 10.1250 | 0.1250 | 10 | 1 |
| 2/1/0 | | 14 | | 10.8125 | 0.8125 | 10 | 0 |
| 2/1/0 | • | 15 | | 11.5000 | 0.5000 | 11 | 1 |
| 2/1/0 | • | 16 | | 12.1875 | 0.1875 | 12 | 1 |
| 2/1/0 | | 17 | | 12.8750 | 0.8750 | 12 | 0 |
| 2/1/0 | • | 18 | | 13.5625 | 0.5625 | 13 | 1 |
| 2/1/0 | • | 19 | | 14.2500 | 0.2500 | 14 | 1 |
| 2/1/0 | | 20 | | 14.9375 | 0.9375 | 14 | 0 |
| 2/1/0 | • | 21 | | 15.6250 | 0.6250 | 15 | 1 |
| 2/1/0 | • | 22 | | 16.3125 | 0.3125 | 16 | 1 |
| 2/1/0 | • | 23 | | 17.0000 | 0.0000 | 17 | 1 |
| 2/1/0 | | 24 | | 17.6875 | 0.6875 | 17 | 0 |
| 2/1/0 | • | 25 | | 18.3750 | 0.3750 | 18 | 1 |
| 2/1/0 | • | 26 | | 19.0625 | 0.0625 | 19 | 1 |
| 2/1/0 | | 27 | | 19.7500 | 0.7500 | 19 | 0 |
| 2/1/0 | • | 28 | | 20.4375 | 0.4375 | 20 | 1 |
| 2/1/0 | • | 29 | | 21.1250 | 0.1250 | 21 | 1 |
| 2/1/0 | | 30 | | 21.8125 | 0.8125 | 21 | 0 |
| 2/1/0 | • | 31 | C02 Clear Signal Output | 22.5000 | 0.5000 | 22 | 1 |

SYSTEM FOR GENERATING HORIZONTAL SYNCHRONIZING SIGNAL COMPATIBLE WITH MULTI-SCAN

BACKGROUND OF THE INVENTION

1. Field of the Invention

The present invention relates to a multi-scan compatible horizontal synchronizing signal generating system for making a horizontal synchronizing signal compatible with multi-scan by generating a predetermined horizontal deflection frequency in a television receiver, a monitor apparatus or the like.

2. Description of the Related Art

As television horizontal deflection frequency generating system, there have hitherto been known not only the television system such as the standard NTSC system and the PAL system but also an EDTV (Extended Definition TV) system for displaying a non-interlaced image by line-doubling an existing NTSC image and a line-doubling system which might be called a flicker-free system for removing a flicker in the PAL system, for example. Also, broadcasting based on a MUSE (Multiple Sub-Nyquist Sampling Encoding) has already been started. From such background, television receivers corresponding to both systems of the MUSE system and the NTSC system have been known.

Then, the above-mentioned systems have different horizontal deflection frequencies. The standard NTSC system has a horizontal deflection frequency of 15.734 kHz and the PAL system has a horizontal deflection frequency of 15.625 kHz. Moreover, since the EDTV system and the line-doubling system of the line-doubling or field-doubling system based on the NTSC, the PAL including the flicker-free system require a horizontal deflection frequency twice as high as those of the standard NTSC, PAL system, the line-doubling system based on the NTSC system (including the EDTV system) requires a horizontal deflection frequency of twice as high as that of the standard NTSC system, 15.734×2=31.468 kHz. Moreover, the line-doubling system based on the PAL system such as the flicker-free system requires a horizontal deflection frequency twice as high as that of the standard PAL system, 15.625×2=31.25 kHz. Furthermore, the MUSE system requires a horizontal deflection frequency of 33.75 kHz.

As described above, when various kinds of television systems become available, although different systems have different horizontal deflection frequencies, a horizontal deflection frequency generating apparatus should preferably be made common from a manufacturing cost standpoint. It was very difficult to form a horizontal deflection frequency generating circuit which may be made compatible with all of the above-mentioned horizontal deflection frequencies of various kinds of television system.

There have hitherto been known two methods of generating a horizontal deflection frequency in a television receiver compatible with a computer display or a point (fixed) frequency.

Initially, a first method is to generate a sawtooth signal by charging and discharging electric charges of a capacitor. FIG. 1 shows its fundamental system diagram. Reference letter C denotes a capacitor to and from which electric charges are charged and discharged. Current sources I0, I1 to which a current flows may be selected by a switch SW. When the current source I1 is selected, a terminal voltage V increases.

When the terminal voltage V becomes higher than a voltage V1, a comparator 1 connects the switch SW to the opposite side to thereby select the current source I1. As a consequence, the terminal voltage V decreases. When the terminal voltage V becomes less than the voltage V0, a comparator V0 connects the switch SW to the current source I1 side again to thereby select the current source I1. After a series of operations were repeated, the terminal voltage V has a sawtooth wave shown in FIG. 1B. The signal thus generated can be used as a fundamental signal of a horizontal deflection signal.

The sawtooth wave of FIG. 1B generated by the first method shown in FIG. 1 is set to the same frequency as the horizontal deflection frequency or a multiplied frequency. In order to make the first method correspond to the multi-scan, if the current values of the charge and discharge current sources I0, I1 increase, then an oscillation frequency increases. Therefore, if angles at which a sawtooth voltage increases or decreases are changed as shown in FIGS. 2A, 2B, then a fundamental frequency is changed so that the first method can be made corresponding to the multi-scan.

However, according to the first method, a problem of jitter performance cannot be neglected. Since a noise is entered into the current sources I0, I1 due to an action of thermal noise from an element, which may determine the reference potentials V0, V1 and the oscillation frequency, it becomes very difficult to use such sawtooth wave signal as a horizontal deflection signal which may be sensitive to the jitter performance. Therefore, there have been adopted various countermeasures such that the values of the current sources I0, I1 are increased considerably in order to make an apparent noise level become small and the capacitance of the capacitor C should be increased as well in order to prevent the oscillation frequency from increasing. However, as the capacitance of the capacitor C increases, the area of an integrated circuit increases, and a power consumption increases unavoidably. In practical design, it should be executed in such a manner that the capacitance of the capacitor C and the current values of the current sources I0, I1 should be suppressed to be small to the extent that a jitter performance may not be degraded. However, since the capacitance of the capacitor and the current values of the current sources are designed to be as small as possible, in actual trial manufacturing, unavoidably, there invariably arises a problem that a jitter performance cannot be improved as it is expected.

Moreover, the biggest defect of this method is that this method requires an adjustment. The capacitance of the capacitor C and the current values of the reference potentials V0, V1 and the current sources I0, I1 should be constantly fluctuated because their components are assembled as integrated circuits. That is, some integrated circuits have a large capacity but other integrated circuit has a small capacity. Therefore, if the above-mentioned integrated circuits are oscillated according to the first method, then their frequencies are unavoidably fluctuated, and the integrated circuits are caused to output different oscillation frequencies. To solve this problem, when such integrated circuits are designed, it is customary that the oscillation frequencies should be adjusted. Thus, after such integrated circuit is mounted on the computer display or the television receiver, the oscillation frequency should be adjusted, which therefore leads to an increase in the manufacturing cost.

Next, a second method is such one in which an oscillator such as a ceramic is used to generate a clock having a reference oscillation frequency f0 without fluctuations and this clock is counted in descending order such that this clock may become a horizontal deflection frequency. FIG. 3 is a block diagram to which reference will be made in explaining this method. An oscillator 101 which oscillates a reference clock may include a ceramic or crystal piezoelectric transducer member having a high Q (a measure of sharpness of piezoelectric transducer system) as an oscillation element. A clock without fluctuations may be generated from the oscillator 101. When a counter 102 counts this oscillation frequency f0 by a value which results from dividing this oscillation frequency with a horizontal deflection frequency fh in a descending order, there can be generated a horizontal deflection clock. It is natural that this method need not adjust the oscillation frequency.

However, the arrangement of this method cannot be made compatible with multi-scan (synchronizing signal generating system compatible with a variety of frequencies if frequencies fall within a determined frequency range). For this reason, in order to make the second method become compatible with the multi-scan, there are further illustrated decoders 111 to 113, which can be made compatible with three kinds of horizontal deflection frequencies. Therefore, this method needs much more decoders in order to obtain a desired horizontal deflection frequency.

Further, a television horizontal synchronizing signal generating system needs various timing signals, e.g. a clamp pulse timing, a blanking timing, a leading edge timing, a trailing edge timing of H drive for horizontal deflection and the like. FIG. 4 is a timing chart showing leading timing signals. In the sheet of drawing, VIDEO signal denotes an inputted video signal, H-SYNC denotes its horizontal synchronizing signal, H-BLK denotes a blanking signal of a video signal, BGP denotes a burst gate pulse or a clamp timing signal of a video signal, HDV denotes a phase comparator timing signal for establishing a synchronization with the center of the horizontal synchronizing signal H-SYNC, and HDREF denotes a timing signal for establishing a synchronization with a flyback pulse FBP from a deflection-system circuit. An integrated circuit may generate a surface acoustic wave SAW at timing of a timing signal HSTIM, and may generate the timing signal of the horizontal deflection signal H-DRV by slicing the surface acoustic wave with a voltage which results from phase-comparing the flyback pulse FBP and the timing signal HDREF.

In this manner, the horizontal synchronizing signal generating system needs various timing signals. To this end, there are used clock signals having frequencies constant times as high as the horizontal synchronizing signal fh. There is used a pulse 32 times as high as the fh clock as a timing signal as illustrated on the uppermost portion of FIG. 4.

It is to be understood that this timing signal can be varied. In the case of a certain horizontal deflection frequency fh, let it be assumed that the count number of the counter is n0. Then, when a horizontal deflection frequency is fh1, the count number becomes not n0 but n1. The value of the counter in certain timing may be changed to entirely different values as the horizontal deflection frequency is changed. FIG. 5 shows an example thereof. This example shows the timing of a clamp pulse. In video signals 1 and 2 having different frequencies, the video signal 1 has timings of counter values 5, 6, 7 necessary for clamp pulse, and the video signal 2 has a timing of counter values 7, 8, 9 necessary for clamp pulse.

It is an object of this invention to provide a system which can solve a problem in which a horizontal deflection frequency generating system compatible with all horizontal deflection frequencies of various kinds of television systems cannot be formed without difficulty because a lock range is narrowed by using an oscillator such as a ceramic having high Q and a system capable of realizing a low jitter, becoming compatible with a multi-scan deflection, removing an adjustment and which can generate pulses compatible with various timing signals.

SUMMARY OF THE INVENTION

Therefore, according to a first of the invention, there is provided a system for generating a horizontal synchronizing signal compatible with multi-scan including a oscillator having a fixed frequency oscillated at a frequency f0 sufficiently higher than a deflection frequency in a multi-scan display, a first counter for counting a clock outputted from the oscillator in descending order wherein an integer which results from rounding a number less than a decimal number obtained by a division of f0÷fh is divided by an integer m less than n to thereby obtain a value k and a time in which the first counter counts the value k is set to one cycle, and a second counter for counting the value k m cycles to form one period, thereby generating the deflection frequency fh and a clock having a frequency multiple times the deflection frequency.

According to a second of the invention, a system for generating a horizontal synchronizing signal compatible with multi-scan according to claim 1, further comprising a third counter in which a value counted in an ascending order can be set freely and wherein in a calculation in which a remainder p is obtained in a calculation of n÷m=k, the value counted in an ascending order is set to p, the third counter counts the value in an ascending order once during the first counter counts the value k, when the counted data becomes larger than m, the first counter set the count value of the next one cycle to k+1, the third counter subtracts m from the counted value and counts the value p in an ascending order with respect to that counted value during the next one cycle, thereby eliminating a deviation of the deflection frequency caused by the remainder p.

Further, according to a third of the invention, in a system for generating a horizontal synchronizing signal compatible with multi-scan, wherein in the system in which the time in which the first counter counts the value k is set to one cycle and the duration in which the first counter repeats m cycles is set to one period, an error of a deflection frequency clock m times as high as the deflection frequency is alleviated by setting an initial value of the third counter to m/2 in the beginning of one period.

Furthermore, according to a fourth invention, the value m is set to power of 2. According to a fifth invention, the system generates a clock having a frequency m times, fixed times, as high as the deflection frequency fh from its inside and generates a variety of timing signals necessary for a system for generating a horizontal synchronizing signal compatible with multi-scan by using such clock.

BRIEF DESCRIPTION OF THE DRAWINGS

FIG. 10 is a diagram showing values of the counters 1 to 3 of the multi-scan compatible horizontal deflection synchronizing system according to the present invention in the form of decimal notation; and FIG. 11 is a diagram showing other embodiment in which values of the counters 1 to 3 of the multi-scan compatible horizontal deflection synchronizing system according to the present invention are illustrated in the form of decimal notation.

DESCRIPTION OF THE PREFERRED EMBODIMENTS

Figure 6:
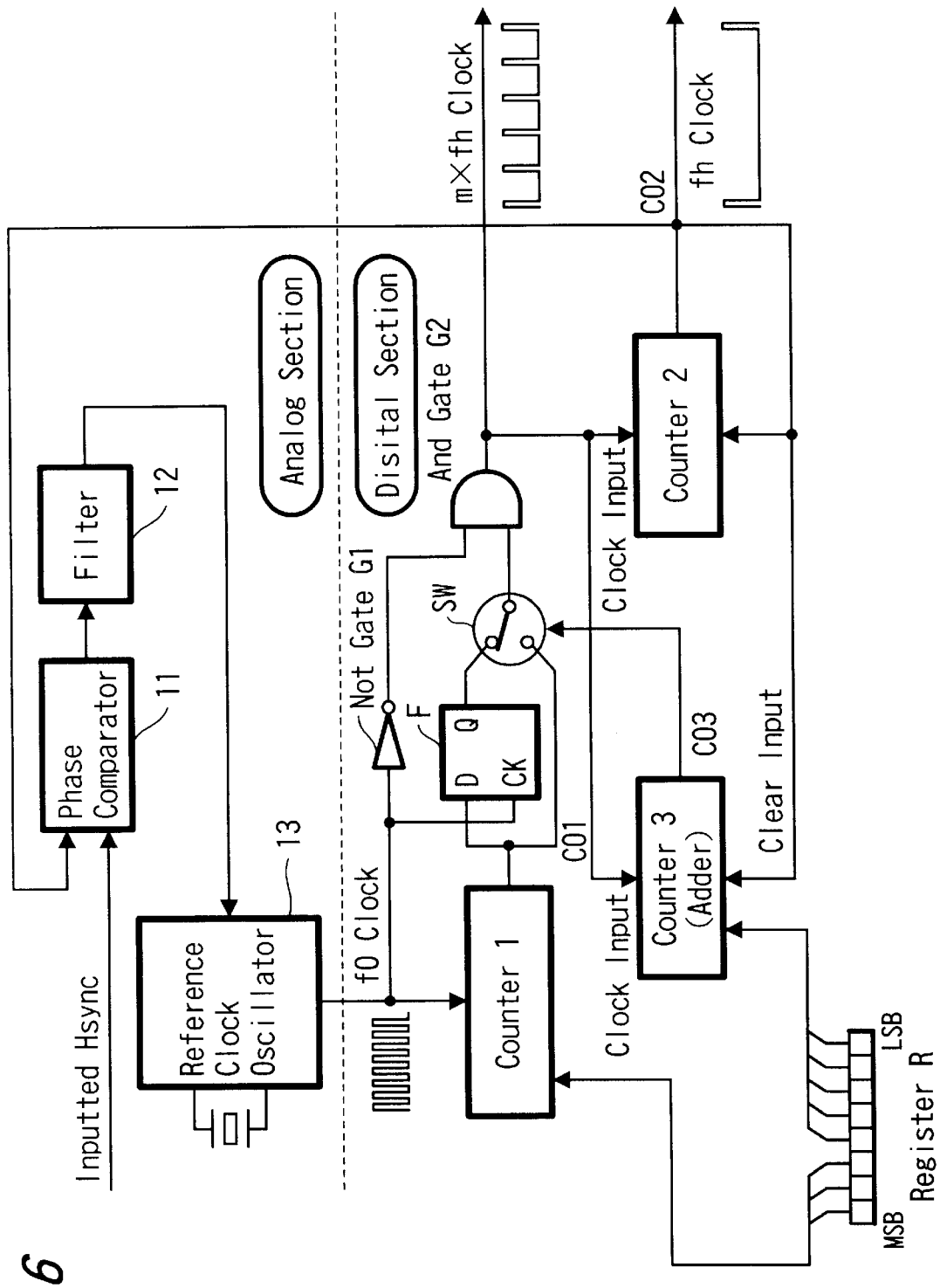
FIG. 6 is a block diagram showing a multi-scan compatible horizontal deflection synchronizing system according to the present invention.
Figure 8:
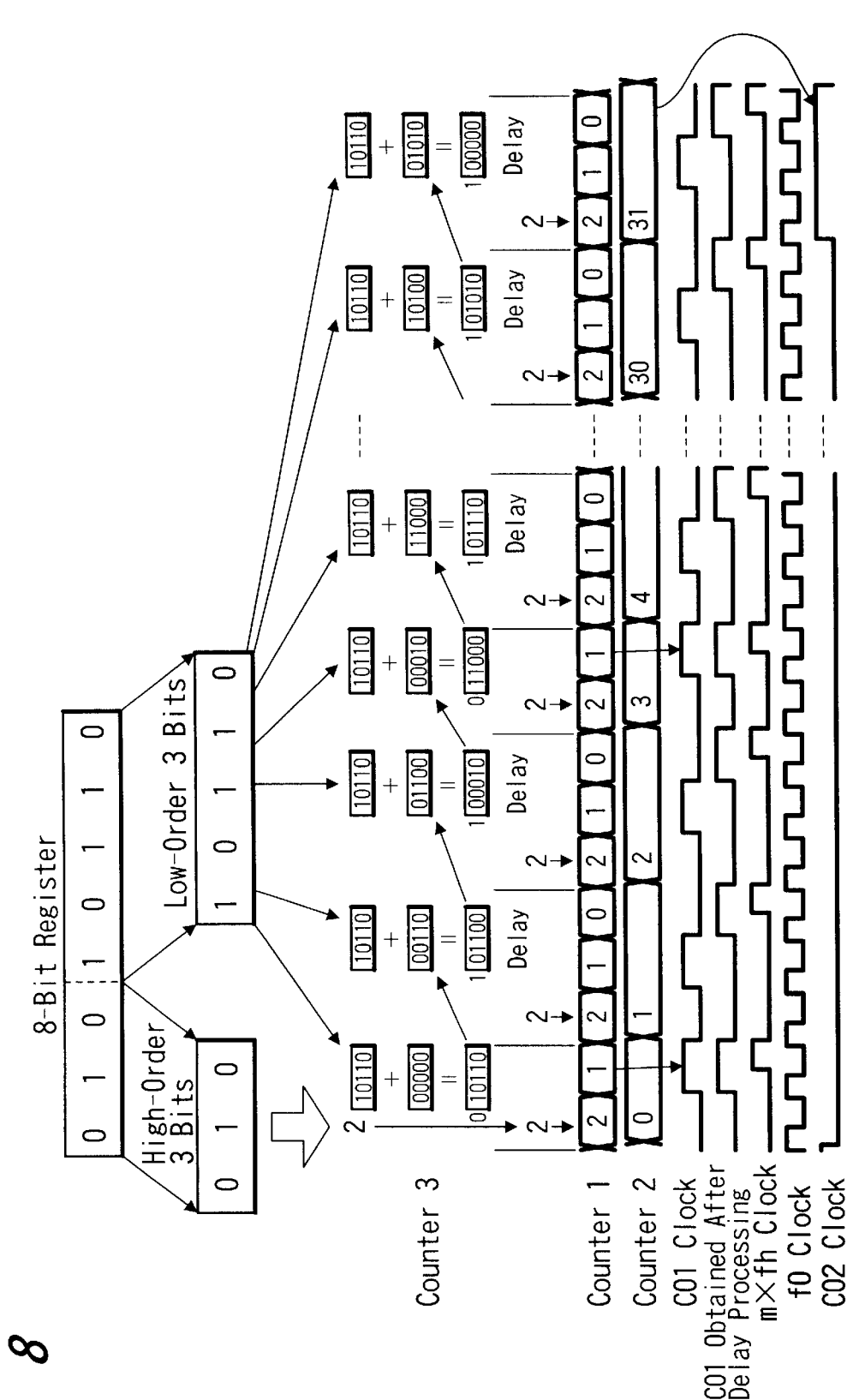
FIG. 8 is a timing chart of the multi-scan compatible horizontal deflection synchronizing system according to the present invention.

A mode for carrying out the invention will be described in detail with reference to the drawings. The present invention may form a stable reference signal source by using a crystal oscillator or the like to thereby generate a horizontal deflection timing pulse compatible with multi-scan. FIG. 6 is a block diagram to which reference will be made in explaining an outline of a first embodiment according to the present invention. FIG. 8 is a timing chart thereof.

The first embodiment according to the present invention shown in FIG. 6 can be divided into an analog section and a digital section. The digital section may be referred to as "block which generates an oscillation clock synchronized with a clock fh". That is, the analog section may be referred to as "block which generates an oscillation clock synchronized with a clock fh". Specifically, there may be arranged a phase-locked loop (Phase Locked Loop, hereinafter referred to as "PLL") in which a clock fh outputted from the digital section and an inputted horizontal synchronizing signal Hsync are phase-compared by a phase comparator 11 and an output from the phase comparator is supplied through a filter 12 and an outputted voltage from the filter is used to control an oscillator which generates a reference clock. Accordingly, the analog section is the same as the conventional PLL and therefore only the digital section, which features the present invention, will be described with reference to FIGS. 6 to 8.

FIG. 6 is a block diagram of a horizontal deflection synchronizing system compatible with multi-scan. The analog section may comprise the phase comparator 11 for phase-comparing the horizontal synchronizing signal Hsync that was synchronizing-separated, for example, with the signal fh clock from the digital section, the low-pass filter 12 for filtering-out the phase-compared output of the phase comparator 11 to form an error signal and a reference clock oscillator 13 whose oscillation frequency and phase are controlled in response to a voltage value of the error signal inputted from the filter 12. The reference clock oscillator 13 should preferably be comprised of a reference clock oscillator whose frequency is fixed, such as a crystal or a ceramic having high Q and a satisfactory jitter performance.

The digital section may comprise, as shown in FIG. 6, a counter 1 for counting a f0 clock oscillated from the reference clock oscillator 13 in the analog section and which outputs a pulse signal C01 when it has counted clocks of a predetermine number, a counter 2 for outputting a timing of a horizontal deflection frequency fh as a pulse signal C02, a counter 3 for outputting a pulse signal C03 to a change-over switch SW each time it counts a pulse in an ascending order, a register R for outputting set values to the counters 1 and 3, an inverting (NOT) gate G1, an AND (AND) gate G2, a D-flip-flop F and the like.

Figure 7:
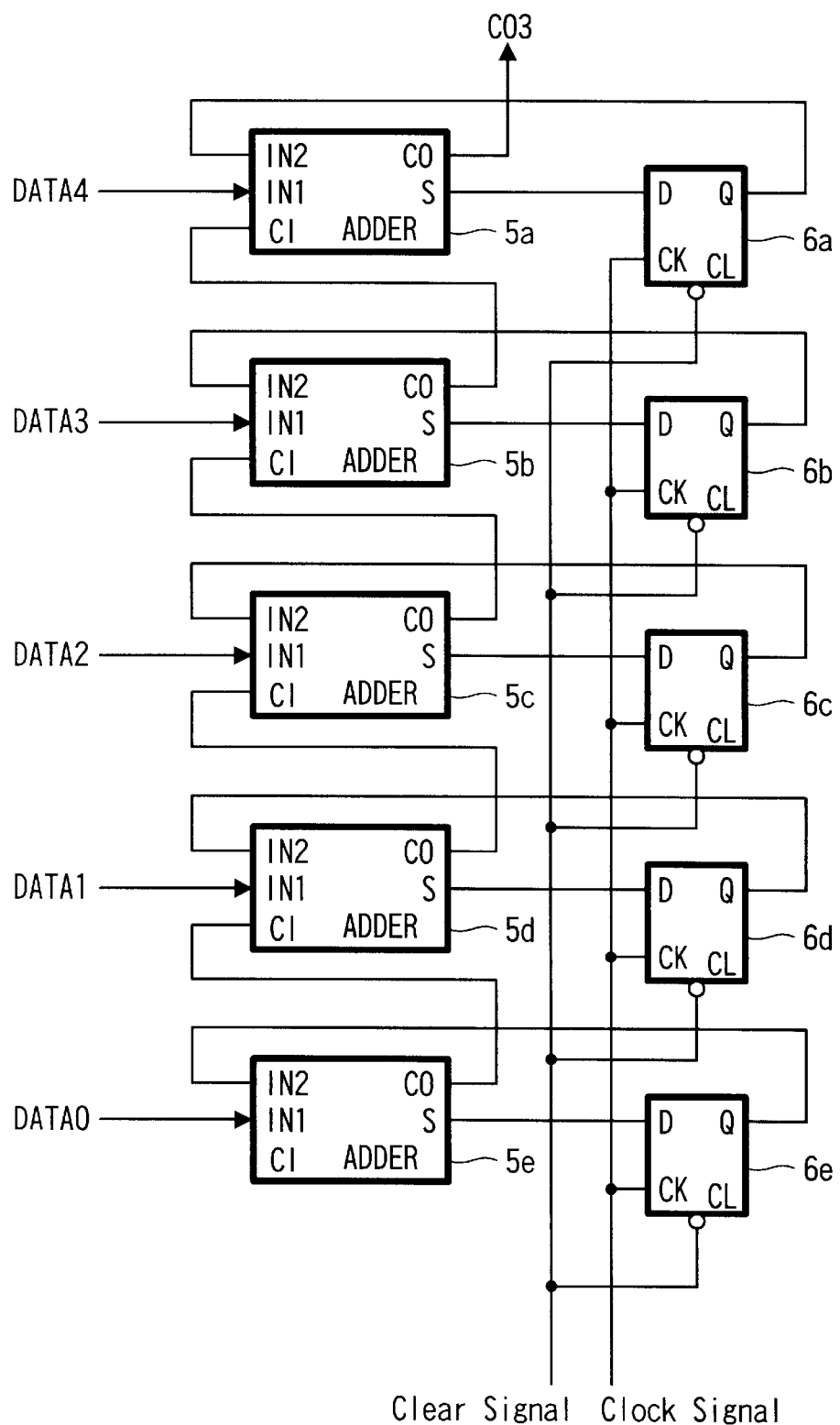
FIG. 7 is a block diagram of the inside of a counter 3 according to the present invention.

An operation of the horizontal deflection synchronizing system will be described next with reference to FIGS. 6 to 8. Let it be assumed that f0 is a reference oscillation frequency of the present system, fh is a desired horizontal deflection frequency, n is an integer which results from rounding less than a decimal point of quotient of f0÷fh, k is a value of quotient obtained when the n is divided by an integer m below n and p denotes its remainder. One cycle assumes a time during which the counter 1 counts the value k by the reference oscillation frequency f0. Each time the counter counts one cycle, it may output an overflow signal as the pulse signal C01. Also, the pulse signal C01 has a clock frequency m times the cycle of the horizontal deflection frequency fh.

The above-mentioned arrangement will be expressed by the equations given below:

$f0 \div fh \approx n$ ($n$ is an integer)

$n \div m = k$ remainder $p$ ($n > m$, $k$ is an integer)

The register R may divide a value in which the value of the above-mentioned integer n was converted into a binary number to provide high-order several bits and remaining low-order bit. The high-order several bits become the count number of the counter 1. The low-order bit becomes an added value of the counter 3. The number of bits of the register R and the division of the high-order bits and the low-order bits are such that the high-order bits are 3 bits and the low-order bits are 5 bits to form 8 bits in total in the case of the embodiment of FIG. 6. This number of bits may be changed by numerical values of f0, fh, m, n, as will be described later on.

The counter 1 may count the reference oscillation frequency f0 by a preset value of high-order several bits transferred from the register R. At the end of the counting, this counter may output the pulse signal C01 to the D-flip-flop F and the change-over switch SW as the overflow signal. Then, the counter 1 may be reset to a predetermined value by an output from the AND gate G2, and the count of one cycle is ended. Then, this counter may start the counting of the next cycle, and may repeat similar operations.

The counter 2 is adapted to count the outputted pulse signal C01 from the counter 1. This counter may complete one cycle by the count number m, and its output may agree with the cycle of the fh clock. To this end, this counter may reset the whole of the system of FIG. 6 at every cycle, and may output the pulse signal C02 as the fh clock simultaneously.

Also, the horizontal synchronizing signal generating system requires a variety of timing signals, and therefore may use a clock signal which results from multiplying the horizontal synchronizing signal fh. To this end, the pulse signal C01 which might be the output from the counter 1 may be outputted from the digital section as it is and may be used as m×fh pulse to make a variety of timing signals.

Figure 2A:
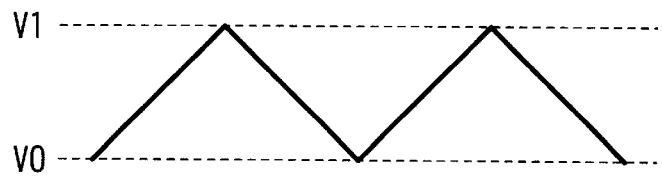
FIG. 2 is A diagram showing sawtooth waveforms obtained when a current value is changed in the system of FIG. 1.
Figure 2B:
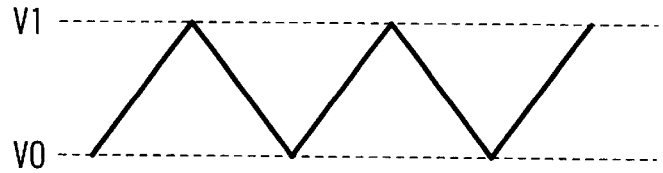

The counter 3 may be arranged as an adder shown in FIG. 2 and may add values DATA0 to DATA4 of low-order 5 bits of the register R in response to the pulse signal C01 used as a clock signal. Accordingly, the counter 3 may require the number of bits which may be the same as the remaining low-order bits of the register R, and therefore may comprise five adders 5a to 5e, each of which includes add input terminals IN1, IN2, an add output terminal S and a carry output terminal CO, and five D-flip-flops 6a to 6e. While data of low-order 5 bits is inputted to the counter 3 of the register R of FIG. 6, for example, the data DATA0 to DATA4 are supplied to input terminals IN1 of the adders 5a to 5e comprising the counter 3. Then, when the clock signal is inputted, the data D0 to D4 are latched in the D-flip-flops 6a to 6e, and outputs are supplied to other input terminals of the adders 5a to 5e. In this manner, the values of the data D0 to D4 are added each time the clock is inputted. When the last adder 5a outputs the pulse signal C03 as an overflow signal (carry signal), the change-over switch SW is switched to the side in which the pulse signal C01 is delayed by one clock (upper side in FIG. 7).

As described above, the pulse signal C01 which is the outputted signal from the counter 1 has two channels. One channel is such one that a signal is directly supplied to the change-over switch SW. When the pulse signal C03 is not outputted, a signal is supplied to the AND gate G2 through this channel. Another channel is such one that a signal is supplied through the D-flip-flop so as to be delayed by one clock in response to f0 clock. The channels are switched by the output of the pulse signal C03 which is the overflow signal from the counter 3. The switch SW may be operated such that when the counter 3 is overflowed and the pulse signal C03 goes to "H", the channel is switched to the channel in which a signal is delayed by one clock in the D-flip-flop F.

The counter 3 should be arranged so as to become compatible with any values of the count value which is incremented in an ascending order. To this end, in this embodiment, the counter may comprise a combination of adders 5a to 5e and flip-flops 6a to 6e as shown in FIG. 7. After the data of the counted value are reset by the clear terminal, the values inputted at the DATA0 to 4 and the current values held by the flip-flops 6a to 6e are added, and the added value is latched in the flip-flops 6a to 6e repeatedly during the next clock. Accordingly, the counter 3 may become the counter in which the values, counted in an ascending order, supplied by the DATA0 to 4 can be set freely by the input from the register R.

With respect to operations of the present invention thus arranged, specific examples will be described with reference to FIGS. 6 to 8.

The reference clock f0 clock generated from the reference oscillator 13 in FIG. 6 is set to 2.7 MHz, for example, and a horizontal deflection frequency fh which is desired as the output of the system is set to 31.5 kHz, for example. Also, when an fh clock having a frequency 32 times as high as the normal frequency is outputted simultaneously, there is obtained a timing chart of FIG. 8.

Moreover, if this system is arranged so as to become compatible with a television standard signal, then in order to obtain 15.734 kHz, 2.7 M÷15,734 k≈176 so that the number of the register bits required by the system becomes 8 bits. Moreover, in order that the fh clock having a frequency 32 times as high as the normal frequency should be outputted, 2.7 M÷32=84.375 kHz becomes a maximum horizontal deflection frequency that can be realized by this system.

Since the horizontal deflection frequency that is desirable this time is 31.5 kHz, the value set to the register R is an integer 86 which results from rounding the number less than the decimal point of the value of 2.7 M÷31.5 kHz≈85.71428. If this value is expressed by a binary number, then this may be expressed as "01010110". This value is set to the register R.

The above-mentioned operations will be expressed by the equations as follows.

2.7M(f0)÷31.5k(fh)≈85.71428≈86(n)(binary number 01010110)

86(n)÷32(m)=2(k) (high-order 3 bits 010)remainder 22(p) (low-order 5 bits 10110)

Figure 3:
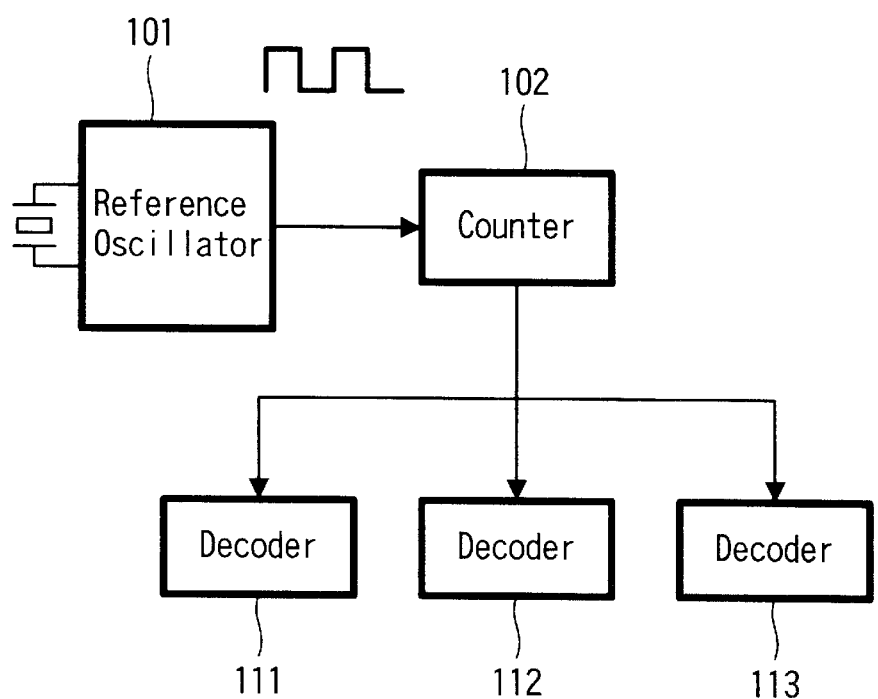
FIG. 3 is a block diagram of a conventional point-scan system using a reference clock.
Figure 4:
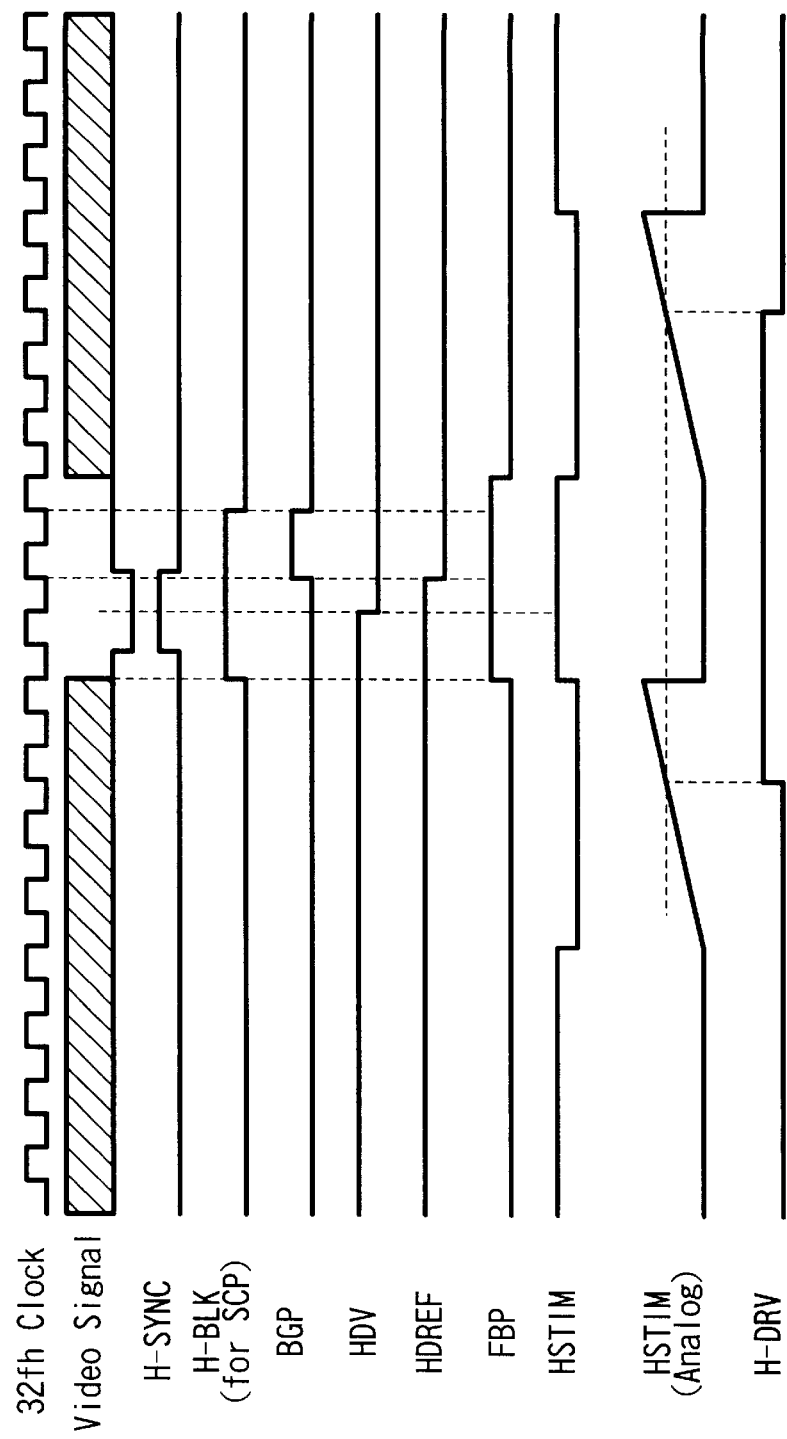
FIG. 4 is an explanatory diagram showing a variety of timing signals required by the horizontal synchronizing signal generating system.
Figure 5:
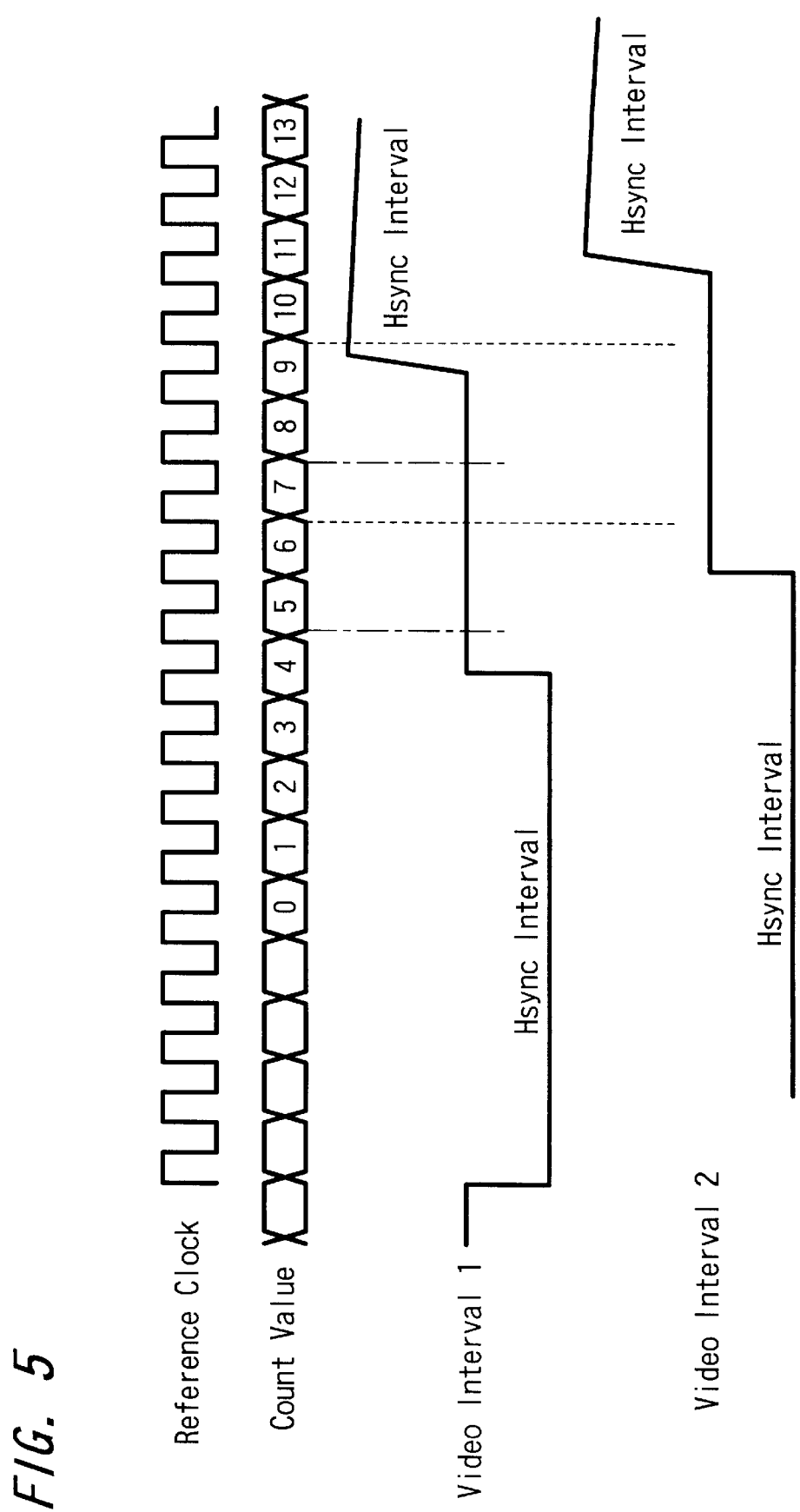
FIG. 5 is a timing chart showing the manner in which counter values of timing signals are changed as the horizontal deflection frequency is changed.

The counter 1 may count a value in an ascending order, and the counter 2 may count a value in a descending order as described in FIG. 3. The counter 1 may output the pulse signal C01 when the count data is "1". That is, when the change-over switch SW is connected to the lower-side contact, it may count two pulses (f0) and then reset.

Initially, the binary number "01010110" of the value n obtained by the above-mentioned calculation is set to the register R. Then, "2" is loaded onto the counter 1, and simultaneously, the counters 2, 3 are cleared. Low-order 5-bit data of the 8-bit register R are constantly inputted to the DATA0 to 4 even though the register is cleared. The initial value of the counter 2 is set to "0", and at that time, the pulse signal C03 of the counter 3 is "0". As a consequence, the pulse signal C01 of the counter 1 in FIG. 6 may select the channel through which it may not pass the D-flip-flop F (lower-side contact of the change-over switch SW). Accordingly, in FIG. 8, when the counter C03 of the counter 3 is "0", the count of the counter 1 may become "2" and "1". When it is "1", the pulse signal C01 goes to "H". Then, the counter 1 is reset at the same time the pulse C01 is outputted, set to "2" by the next reference clock, and the counters 2, 3 are incremented simultaneously.

Since m×fh clock which becomes a timing pulse synchronized with the fh clock is outputted from the AND gate G2 by performing the function of logical AND of the output of the NOT gate G1 which inverts the f0 clock and the pulse signal C01, it may have a waveform having a narrow "H" width as shown in FIG. 8.

When the counter 2 is incremented, simultaneously, the counter 3 holds the aforementioned added result "10110". Thus, since inputted data, which was counted in an ascending order, is constantly the low-order 5-bit data of the 8-bit register R, the previously-held "10110" and the low-order 5-bit data "10110" of the register R are added. Although the result is "101100", the counter is of the 5-bit counter so that the added result is "01100" and "1" is outputted as the carry pulse signal C03. At that very moment, the switch SW is switched to the upper contact and the pulse signal C01 of the counter 1 selects the contact which passes the side in which the D-flip-flop F delays a signal by one reference clock (upper contact of the change-over switch SW shown in FIG. 6), and the count value of the counter 1 is not reset immediately after "2", "1", thereby resulting in a signal being delayed by another one clock. FIG. 8 shows such state by "2", "1", "0". The important point is that, although data is "1" and the pulse signal C01 goes to "H", the signal goes to "H" with a delay of one clock by the delay processing and supplied to the counters 2, 3 and also the counter 1 is reset by a delay of one clock. Therefore, the counter 1 is caused to count "0".

After the above-mentioned operations, the counter 1 is reset, set to "2", and simultaneously the counters 2, 3 are incremented. In this manner, when the counter 3 which counts data of low-order 5 bits outputs the carry output C03, the counter 1 repeats the operations in which the counter counts 3 clocks and counts 2 clocks in the absence of carry output.

Then, when the value of the counter 2 goes to "31", the added result of the counter 3 goes to "00000" and the remainder in the counter 3 goes to "0". The reason for this is that the 5-bit data "DATA0 to 4" which might be the added value in the counter 3 is added 32 times and is similar to the case in which a calculation of 5 bit-data×32 is executed.

"Multiplication with 32" in the binary number may be similar to the case in which register data are shifted by 5 bits in the left. By the above-mentioned operation, the low-order 5 bits of the 8-bit register may be properly set to the counter 1 which counts the high-order 3 bits through the switch SW without remainder. Accordingly, this system is able to generate the horizontal frequency fh of 31.395 kHz which results from accurately frequency-dividing the f0 clock of 2.7 MHz by 85.71428.

Figure 1A:
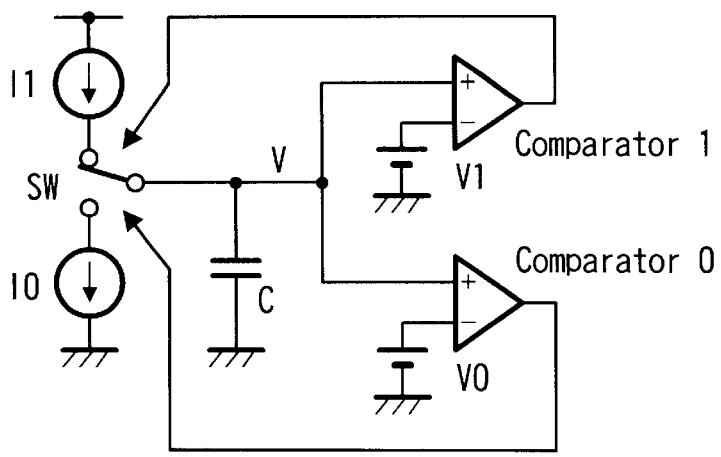
FIGS. 1A and 1B are diagram showing a conventional multi-scan oscillation system of a current-changing type.
Figure 1B:
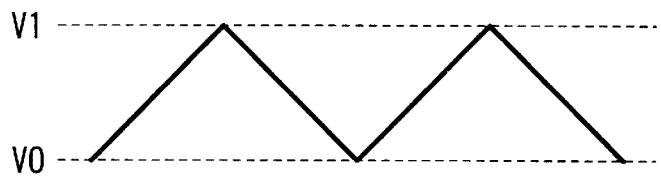

Incidentally, FIG. 8 shows clock output m×fh. This outputted signal directly becomes the fh clock 32 times as high as the normal clock. A study of FIG. 1 reveals that a timing at which the carry pulse goes from "L" to "H" is increased or decreased by an amount of f0 clock and may not be the 32-times fh clock having an equal interval accurately. If the precise 32-times fh clock is virtually located in the timing chart of FIG. 8, then the timing at which the pulse signal C02 outputted from the counter 3 shown in FIG. 8 goes to "H" is approximately the same as the accurate timing at which the 32-times fh clock goes to "H". Then, since the 32-times fh clock is used only to generate a variety of timing signals as described before, even when the timing at which the clock goes to "H" is fluctuated, such fluctuation of timing occurs in one f0 clock. There then arises no serious problem.

Figure 9:
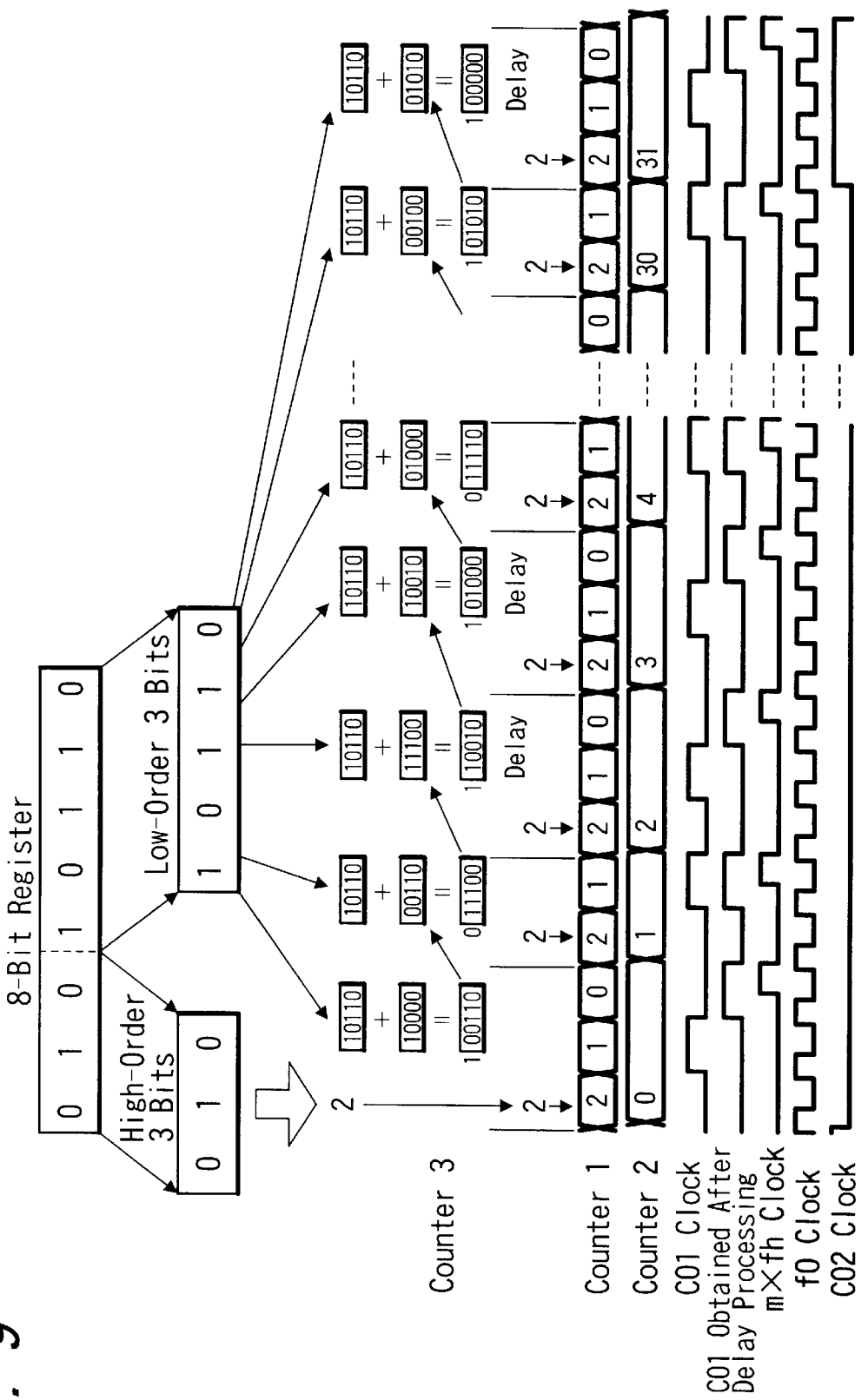
FIG. 9 is a timing chart of the multi-scan compatible horizontal deflection synchronizing system according to other embodiment of the present invention.

Incidentally, a second embodiment in which a deviation of the pulse signal C02 from the precise 32-times fh clock is alleviated much more is shown in FIG. 9.

The timing chart of FIG. 9 shows the case in which the first reset value of the counter 3 is set to "100001". If the reset value is set to this one, then the timing at which the pulse signal C03 goes to "H" is changed as compared with FIG. 8.

The meaning of this addition will be described. The system according to the first embodiment of FIG. 6 will be described from another viewpoint. Although the counter 1 handles the high-order 3 bits of the register R as an integer to fundamentally the 32-times fh clock, the counter 1 considers the low-order 5 bits as a number less than a decimal point, and the value overflowed to the integer region when the counter 3 computes the number less than the decimal point is reflected on the counter 1 through the switch SW.

At that very moment, the manner in which the value less than the decimal point (low-order 5 bits) is reflected on the integer region (high-order 3 bits) is the round-off in the first embodiment shown in FIG. 8 and is the rounding in the second embodiment shown in FIG. 9. FIGS. 10 and 11 illustrate the pulse signals C01, C02, C03 of one period in which the low-order 5 bits are computed as numerical values less than the decimal point of decimal number. The first embodiment is shown in FIG. 10, and the second embodiment is shown in FIG. 11. Assuming that the low-order 5 bits are numerical values less than the decimal point, then the binary number "10110" is 0.6875 in decimal number, and the binary number "10000" is 0.5 in decimal number. In the case of the first embodiment, since the initial value of the counter 3 is zero, even when the binary number "10110" is added to the counter 3, the carry does not occur. However, in the case of the second embodiment, since the initial value of the counter 3 is "10000" in binary number (0.5 in decimal number), when the binary number "10110" is added to the counter 3 (that is, 0.5+0.6875), the overflow occurs so that the pulse signal C03 goes to "H".

Incidentally, when the reference frequency is set to 2.7 MHz, if it is intended to obtain a MUSE-system horizontal deflection frequency 33.75 kHz, then 2.7M(f0)+33.75K(fh)=80(n)(binary number 01010000)

80(n)=(m)=2(k)(high-order 3 bits 010) . . . remainder 16(p)(low-order 5 bits 10000)

Thus, the horizontal deflection frequency can be generated with ease.

According to the present invention, in the horizontal deflection system of the television receiver, a low jitter can be realized by an oscillator such as a ceramic having a high Q, this horizontal deflection system is made compatible with multi-scan, an adjustment can be made unnecessary, and timing signals for a variety of controls can be outputted simultaneously.

Having described preferred embodiments of the present invention with reference to the accompanying drawings, it is to be understood that the present invention is not limited to the above-mentioned embodiments and that various changes and modifications can be effected therein by one skilled in the art without departing from the spirit or scope of the present invention as defined in the appended claims.

What is claimed is:

1. A system for generating a horizontal synchronizing signal compatible with multi-scan comprising:

a oscillator having a fixed frequency oscillated at a frequency f0 sufficiently higher than a deflection frequency fh in a multi-scan display;

a first counter for counting a clock outputted from said oscillator in a descending order wherein an integer n which results from rounding a number less than a decimal number obtained by a division of f0 fh is divided by an integer m less than n to thereby obtain a value k and a time in which said first counter counts said value k is set to one cycle, that is, one cycle of a clock having a frequency constant times as high as said deflection frequency; and a second counter for counting said value k m cycles to form one period, thereby generating the deflection frequency fh.

2. A system for generating a horizontal synchronizing signal compatible with multi-scan according to claim 1, further comprising a third counter in which a value counted in an ascending order can be set freely and wherein in a calculation in which a remainder p is obtained in a calculation of n m=k, the value counted in an ascending order is set to p, said third counter counts the value in an ascending order once during said first counter counts said value k, when said counted data becomes larger than m, said first counter sets the count value of the next one cycle to k+1, said third counter subtracts m from the counted value and counts the value p in an ascending order with respect to that counted value during the next one cycle, thereby eliminating a deviation of the deflection frequency caused by the remainder p.

3. A system for generating a horizontal synchronizing signal compatible with multi-scan according to claim 2, wherein in said system in which the time in which said first counter counts the value k is set to one cycle and the duration in which said first counter repeats m cycles is set to one period, an error of a deflection frequency clock m times as high as the deflection frequency is alleviated by setting an initial value of said third counter to m/2 in the beginning of one period.

4. In a system for generating a horizontal synchronizing signal compatible with multi-scan as claimed in claim 1, wherein the value m is set to power of 2.

5. In a system for generating a horizontal synchronizing signal compatible with multi-scan as claimed in claim 1, wherein the system generates a clock having a frequency m times, fixed times, as high as said deflection frequency fh from its inside and generates a variety of timing signals necessary for a system for generating a horizontal synchronizing signal compatible with multi-scan by using such clock.

* * * * *